June 2, 1936. R. D. SMITH 2,042,740
COMBINED BRAKE BEAM AND BOTTOM ROD SUPPORT FOR CARS
Filed Oct. 21, 1935
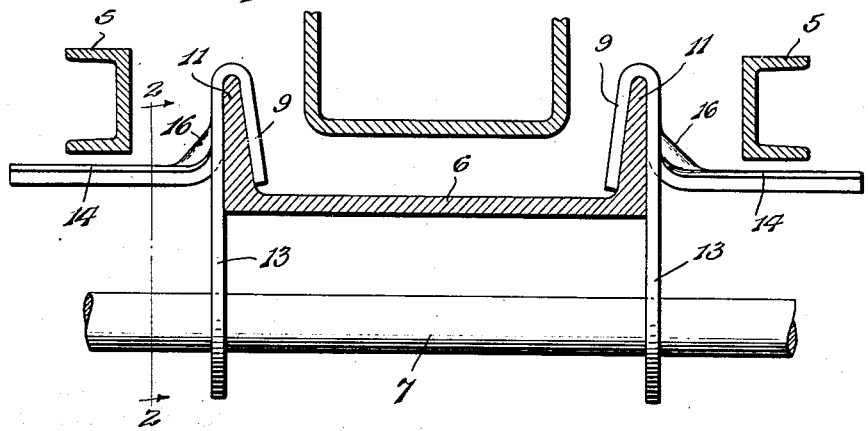
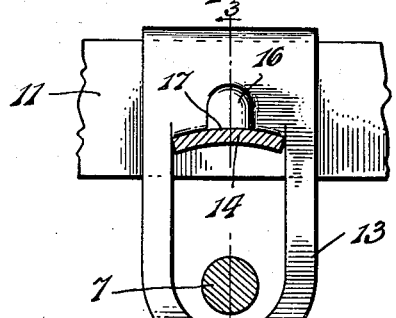
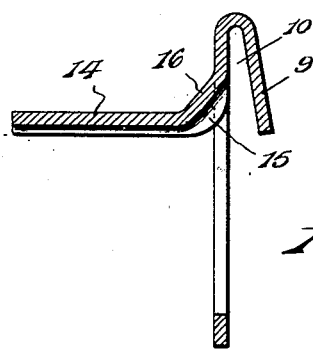
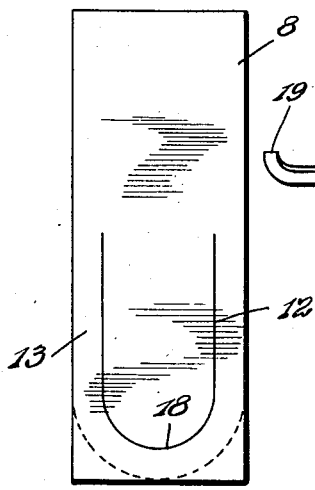
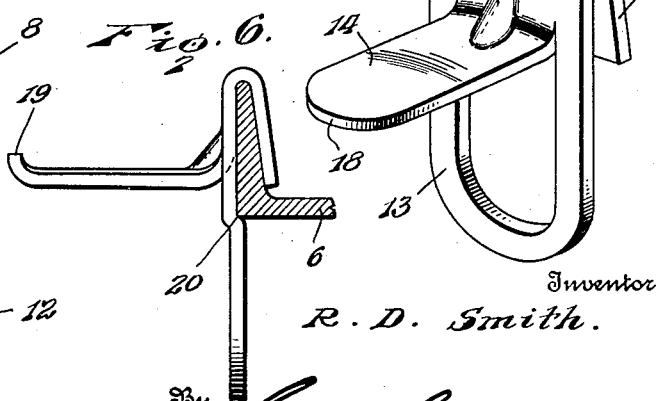
Inventor
R. D. Smith.
Attorneys Patented June 2, 1936

2,042,740

UNITED STATES PATENT OFFICE 2,042,740

COMBINED BRAKE BEAM AND BOTTOM ROD SUPPORT FOR CARS

Richard D. Smith, Andover, Va., assignor of one-half to Joseph L. Ortner, Cincinnati, Ohio Application October 21, 1935, Serial No. 46,006

8 Claims. (Cl. 188—210)

This invention relates to safety mechanism for railway cars and more particularly to a combined brake beam and bottom brake rod support for the brake rigging thereof.

The object of the invention is to provide a safety device of simple and efficient construction capable of being economically stamped, punched, or otherwise formed from a single sheet of material and by means of which the brake beam and brake rod will be effectually prevented from falling on the track should either of said parts become broken or fail to function properly.

A further object of the invention is to provide a safety device comprising a unitary structure having a suspension hook for engagement with the spring-board of a car truck and provided with an integral depending rod supporting loop or stirrup, the material between the legs of the stirrup being bent laterally at one side thereof to form a substantially horizontal supporting arm adapted to extend beneath the brake beam.

A further object is to increase the rigidity and stability of the horizontal supporting arm by making the arm concavo-convex in cross section and to reinforce and strengthen said arm at its junction with the suspension hook by the provision of a hollow diagonally disposed web or brace which is pressed into the metal during the stamping or forming operation.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a vertical sectional view of a portion of a railway car truck showing the safety device in position thereon.

Figure 2 is a vertical sectional view taken on the line 2—2 of Figure 1.

Figure 3 is a vertical sectional view of the bracket detached.

Figure 4 is a perspective view of the complete bracket.

Figure 5 is a plan view of a blank from which the bracket is formed.

Figure 6 is a side elevation illustrating a modified form of the invention.

The improved safety device forming the subject-matter of the present invention is principally designed for application to railway car trucks and, by way of illustration, is shown in connection with a portion of a truck in which 5 designates the brake beams, 6 the spring-board and 7 the brake rod which extends beneath the spring-board in the usual manner. The device comprises a unitary structure in the form of a bracket, two of which are preferably used on each truck and arranged in pairs at opposite sides of the spring-board 6, as best shown in Figure 1 of the drawing. The bracket is stamped or otherwise formed from a single metallic blank 8 of the construction shown in Figure 5, one end of the metal blank 8 being bent or folded downwardly to form an inverted U-shaped hook 9 defining a substantially wedge-shaped seating recess 10 adapted to receive the adjacent upstanding flange 11 of the spring-board 6. The metal at the lower end of the blank 8 is formed with a U-shaped incision 12 defining a vertically disposed supporting loop or stirrup 13 adapted to receive the brake rod 7. The metal between the legs of the supporting loop or stirrup is pressed laterally and upwardly to form an integral substantially horizontally disposed supporting arm 14 adapted to extend beneath the brake beam 5. The arm 14 is preferably concavo-convex in cross section to impart the desired rigidity and stability thereto and the metal at the junction of the arm 14 and the adjacent leg of the hook 10 is pressed laterally at 15 to form a hollow diagonally disposed brace 16 which serves to retain the arm 14 in a fixed position and prevent accidental bending thereof when subjected to strains or stresses. The concavo-convex formation of the arm 14 provides a curved upper surface 17 which assists in preventing longitudinal displacement of the brake beam should the latter break and fall upon the arm. In manufacturing the bracket, the corners of the blank 8 at one end thereof are preferably cut away during the stamping operation to provide a curved or rounded terminal 18 so that no sharp corners are presented which would tend to interfere with the proper functioning of the device. When the bracket is positioned on a car truck, the overhanging hook 9 will frictionally engage the wedge-shaped upstanding flange of the spring-board 6 and thus securely hold the device in position thereon without the employment of bolts, screws, rivets, or other fastening devices. Furthermore, inasmuch as the rod 7 passes through the supporting loop or stirrup 13, should excessive vibration of the truck have a tendency to loosen the bracket on the spring-board, the lower end of the loop or stirrup, by engagement with the brake rod 7, will limit the upward movement of the bracket and prevent said bracket from becoming accidentally disengaged from the flange of the spring-board.

It will thus be seen that there is provided a new article of manufacture embodying an integral or homogeneous structure which can be conveniently and economically stamped from a single length of metal and which will effectually prevent the brake beam and brake rod from falling on the track should either of said parts become broken or fail to function properly, thereby preventing serious accidents which might otherwise occur. Inasmuch as the suspension hook, rod supporting stirrup and horizontal arm are stamped from a single sheet of metal, a unitary structure is provided, the parts of which coact to support the brake beam and brake rod in case of accident and without the employment of independent elements for this purpose. Furthermore, the convex formation of the horizontal arm 14 imparts the desired rigidity thereto while the hollow diagonal brace reinforces said arm at its junction with the suspension hook, thereby providing a thoroughly stable and reliable safety device under all conditions of service. In Figure 6 of the drawing, there is illustrated a modified form of the invention in which the curved end 18 of the horizontal arm is pressed or deflected upwardly to form a terminal upstanding lip 19 which will assist in preventing the brake beam from slipping off the end of the arm in case the brake beam should fall on said arm. In this form of the device, the metal constituting the legs of the loop or stirrup is bent or offset laterally to form a stop shoulder 20 adapted to spring under the board 6 when the bracket is positioned thereon and prevent vertical movement of said bracket, said shoulder also acting as a guide when the bracket is driven in place. It will thus be seen that vertical movement of the bracket shown in Figure 1 is prevented by coaction between the loop and brake rod, while in Figure 6 vertical movement of the bracket is prevented by engagement of the stop shoulder with the spring-board.

The metal blank 8 is preferably of uniform thickness throughout its entire area so that the different elements or parts of the brackets are of correspondingly uniform thickness and strength. It will, of course, be understood that the brackets may be made in different sizes and shapes and constructed from any suitable material without departing from the spirit of the invention.

Having thus described the invention, what is claimed as new is:

1. A safety device for car trucks comprising an integral bracket having a vertical rod supporting loop terminating at its upper end in an overhanging hook for engagement with a flange of a spring-board, a brake beam supporting arm extending laterally from that side of the bracket opposite the hook, and a brace connecting the arm and adjacent portion of the hook.

2. A safety device for car trucks comprising an integral bracket having a vertically disposed rod supporting loop terminating at its upper end in an overhanging hook for engagement with a flange of a spring-board, a brake beam supporting arm extending laterally from that side of the bracket opposite the hook and concavo-convex in cross section, and a hollow brace disposed at the junction of the arm and adjacent portion of the hook and forming a rigid connection between said parts, the walls of the loop being offset to form a stop shoulder for engagement with the bottom of the spring-board.

3. A safety device for car trucks comprising an integral bracket having a vertically disposed rod supporting loop terminating at its upper end in an overhanging depending hook defining a wedge-shaped recess adapted to receive a flange of a spring-board, a brake beam supporting arm extending laterally from that side of the bracket opposite the hook, said arm being concavo-convex in cross section and having its free end curved transversely, and a diagonal brace connecting the arm and adjacent portion of the overhanging hook and terminating short of the closed end of the hook.

4. As a new article of manufacture, a safety device for car trucks comprising an integral bracket stamped from a single sheet of metal, one end of which is bent to form an overhanging suspension hook, there being a substantially U-shaped incision formed in the other end of the sheet to form a rod supporting loop and the metal between the legs of the loop being pressed laterally and upwardly to form a substantially horizontal supporting arm.

5. A safety device for car trucks comprising an integral bracket stamped from a single sheet of metal, one end of which is bent downwardly on one side of the sheet to form an overhanging substantially wedge-shaped hook, there being spaced incisions formed in the other end of the metal sheet to form a rod supporting loop and the metal between the legs of the loop pressed laterally and upwardly on the other side of the sheet to form a horizontal arm, the metal at the junction of the hook and arm being pressed laterally to provide a diagonally disposed connecting brace and the metal constituting the legs being offset to provide a stop shoulder disposed beneath said horizontal arm.

6. A safety device for car trucks comprising a bracket stamped from a single sheet of metal of uniform thickness throughout its entire area, one end of the sheet of metal being bent downwardly to form an overhanging tapered hook for engagement with a flange of a spring-board, the other end of the metal sheet being cut away to form a curved terminal and provided with a substantially U-shaped incision defining a vertically disposed rod supporting loop, the metal between the walls of the incision being pressed laterally and upwardly to form a substantially horizontally disposed supporting arm, the lower surface of which is convex and disposed substantially in alinement with the free end of the hook, the metal at the junction of the hook and arm being pressed laterally to form a hollow diagonally disposed connecting web.

7. A safety device for car trucks comprising an integral bracket stamped from a single sheet of metal, one end of which is bent downwardly to form a tapered suspension hook for engagement with a flange of a spring-board, there being incisions formed in the other end of the metal sheet and the metal between the incisions pressed laterally and upwardly to form a supporting arm and a depending loop disposed at substantially right angles to the arm, the free end of the arm being bent upwardly to form a stop lip and the metal at the inner end of the arm being pressed laterally at its junction with the hook to form a diagonally disposed reinforcing brace.

8. A safety device for car trucks comprising an integral bracket stamped from a single sheet of metal, one end of which is bent downwardly to form a tapered suspension hook for engagement with a flange of a spring-board, there being incisions formed in the other end of the metal sheet and the metal between the incisions pressed laterally and upwardly to form a supporting arm defining a depending loop having an offset portion forming a stop shoulder adapted to bear against the bottom of the spring-board, the free end of the arm being bent upwardly to form a stop lip and the metal at the inner end of the arm being pressed laterally at its junction with the hook to form a diagonally disposed reinforcing brace.

RICHARD D. SMITH.